United States Patent [19]

Beh et al.

[11] 4,254,319

[45] Mar. 3, 1981

[54] PORTABLE MICROWAVE OVEN-TURNTABLE DEVICE

[76] Inventors: Bruce Beh; Patricia M. Beh, both of Lloyd La., Huntington, N.Y. 11743

[21] Appl. No.: 51,997

[22] Filed: Jun. 25, 1979

Related U.S. Application Data

[63] Continuation of Ser. No. 829,723, Sep. 1, 1977, abandoned.

[51] Int. Cl.³ .............................................. H05B 6/80
[52] U.S. Cl. ............................. 219/10.55 F; 99/443R; 108/20; 108/139; 126/338; 198/803; 248/349; 219/10.55 E
[58] Field of Search .................. 219/10.55 E, 10.55 F, 219/10.55 R, 10.55 A, 10.55 M; 126/41 A, 182, 150, 338; 198/803; 108/94, 20, 139; 99/443 R; 274/1 C, 39 R, 39 A; 248/349

[56] References Cited

U.S. PATENT DOCUMENTS

| | | |
|---|---|---|
| 176,590 | 4/1876 | Brigham . |
| 1,554,105 | 9/1925 | Riviere ................................. 274/1 C |
| 2,843,037 | 7/1958 | Waas ..................................... 99/423 |
| 3,436,506 | 4/1969 | Smith .............................. 219/10.55 F |
| 3,503,323 | 3/1970 | Swetlitz ............................... 99/443 R |
| 4,036,151 | 7/1977 | Shin ................................ 219/10.55 F |
| 4,092,512 | 5/1978 | Suzuki et al. ................... 219/10.55 E |
| 4,219,715 | 8/1980 | Mandle et al. ................. 219/10.55 F |

FOREIGN PATENT DOCUMENTS

| | | |
|---|---|---|
| 51-150557 | 12/1976 | Japan . |
| 5292454 | 7/1977 | Japan . |
| 12465 | of 1894 | United Kingdom .............. 219/10.55 F |

Primary Examiner—Arthur T. Grimley
Attorney, Agent, or Firm—Amster, Rothstein & Engelberg

[57] ABSTRACT

In a preferred embodiment of the invention, a totally non-metallic and portable turntable and driving mechanism thereof, insertable into microwave oven space the same as any other item would be placed into the oven space, having a plastic coil spring as the driving mechanism thereof, and having an optionally utilizable detachably mountable stationary stiring arm which stirs food cooking within a vessel being revolved on the revolting turntable.

14 Claims, 5 Drawing Figures

PORTABLE MICROWAVE OVEN-TURNTABLE DEVICE

This is a continuation of application Ser. No. 829,723 filed Sept. 1, 1977, now abandoned.

This invention relates to a novel microwave turntable.

BACKGROUND OF THE INVENTION

Prior to the present invention there have existed problems and difficulties associated with the now widely-used modern microwave ovens. For example, within a microwave oven, there cannot exist any metallic article of any type, since such would destroy the functioning of the microwave oven. At the same time, there exists the requirement the the food being cooked be repositioned periodically in order to achieve even cooking at all points throughout the food, and thereby to concurrently avoid the prevelant and notorious uncooked or raw spots, and the other over-cooked, or charred portions resulting from a concentration of microwaves at particular points within the microwave ovens. Instructions furnished with such ovens, instruct the housewife to periodically stir or otherwise reposition the food within the oven, to avoid such problems. In another effort to obviate such problems, some recent microwave ovens have incorporated a bottom or floor thereto having a aperture about centrally therein with a rotary shaft extending upwardly therethrough supporting a revolvable turntable mounted on the top thereof, with a motor driving mechanism located beneath mounted within and on the base support structure of the oven outside of the oven microwave space. The extra expense in the manufacture of such oven must be passed on to the consumer, including the placing of a hole in the base floor of the oven, and including the complicated and expensive permanent mounting of a driving motor onto the oven structure, and additional oven below-floor space being required in the building of the oven, in order to accomodate the driving motor and mounting thereof below the floor, to say nothing of the labor involved therein during the manufacture. Also, with such device, the hole is permanent, as well as is the turntable thereof, not removable detachably in such situations that might in the preference of the cook be devoid of such turntable. Also, the mechanism driving the turntable is mounted within the base and is not readily accessible for repair, and normally is an electric motor, such motors being readily susceptable to breaking-down, requiring constant periodic lubrication, and the like.

SUMMARY OF THE INVENTION

Objects of the present invention include the overcoming and avoiding of problems and difficulties and disadvantages of the types described above, together with novel advantages and utilities.

Another object is to obtain a portable turntable adaptable for operative use within a microwave oven.

Another object is to obtain a novel use of a turntable driving element, namely a spring adapted for new use within a microwave oven.

Another object is to obtain a novel microwave oven turntable of simple and practical design, economically feasible and sufficiently simple in use as to constitute no problems to non-mechanically-oriented housewives, and of a durable nature not readily susceptible to breakdown or deterioration, and of a portable nature optionally insertable into oven space for support of and revolving of food-containing vessels or the like as are typically used in microwave ovens.

Another object is to obtain a novel structure being totally non-metallic, including the avoidance of metallic gears, spring driving mechanism, and support structure thereof, together with non-metallic attachments together of the parts thereof.

Other objects become apparent from the preceeding and following disclosure.

One or more objects are obtained by the invention as typically illustrated in the merely representative but not restrictive embodiments illustrated herein, for purposes of facilitating improved understanding, but the invention extending to and including other embodiments representing obvious variations and modifications thereof.

Broadly the invention may be defined as a method and a device for optional insertion and withdrawal from microwave oven space and when utilized, revolving food within the oven space by a portably removable turntable device that includes a non-metallic drive and a non-metallic turntable drivably connected thereto both within the oven space.

More particularly, the method includes the steps of placing the non-metallic drive, preferably a plastic spring, and more preferably a coil spring, into and within a microwave oven space, and thereafter driving a turntable rotatably by and through the driving connection of the non-metallic spring; obviously during normal microwave cooking, there would be supported on the upper surface of the turntable the utensil, such as a non-metallic vessel containing food to be cooked, with the ratation of the turntable at a predetermined rate for even microwave cooking of the food. More preferably, for the sake of simplicity, instead of a winding key or the like, preferably the method includes merely reversely winding the turntable by appropriate spinning thereof, followed by the above-noted driving which is conventionally-achieved by inclusion of a simple non-metallic escapement device of the type conventional and widely known in the art, except of non-metallic elements thereof—this not being any invention in the making of such conventional escapement mechanism.

The novel portable microwave oven-turntable device broadly stated, includes—as noted above, the non-metallic spring and the non-metallic turntable mounted drivably to the spring, portably insertable into and withdrawable from oven space of any conventional microwave oven.

More particularly, the portable microwave oven-turntable device includes a non-metallic spring mechanism for controlled unwinding and release thereby of spring-stored energy; together with a non-metallic turntable mechanism for supporting and the revolving thereon of a supported cooking utensil in a substantially horizontal plane, and at a rate as set to effect proper microwave cooking of food carried in the cooking utensil; and together with portable support mechanism or structure adapted to mount the spring mechanism and the turntable mechanism devoid of metallic attachment elements, and being of a size and shape for insertion into a microwave oven cooking space. Accordingly, the food may be easily rotated at a controlled rate by a simple portable device, during the microwave cooking of the food. It should be noted, however, that while the turntable device is portably insertable, it is within the scope of the invention to appropriately anchore the same by any desired suitable mechanism and/or structure, within the oven, within the spirit of the invention—if it be desired to make the insertion substantially permanent, rather than removable.

The plastic spring employed in the present invention has been known heretofore, but never before used in association with any kind of oven, much less with a microwave oven for the present need and use, fulfilling the present objects of Applicant's invention.

However, also, for Applicant's invention, it has been found that the plastic spring in the form of a coil spring is preferred, and further preferred embodiments of the spring respectively include other features as follow. In one preferred embodiment, the coil spring is broad at one end thereof, normally the base-anchored end, and gradually narrows in width progressively toward the turntable-attached and driving end thereof.

In another preferred spring embodiment, the coil spring includes a rib along the back of the spring, normally about central of its width, running along the length thereof, preferably continuous, but may be intermittent, being plastic.

In an alternate preferred embodiment, the plastic coil spring has a cross-section of half-circle, i.e. half a disk in shape.

The rib, above-noted, and the half-disk, above-noted, serve to improve resiliency and strength to the respective plastic spring structures, thereby serving better to rotate the turntable having a heavy food-laden cooking vessel, container or other utensil, based upon Applicant's experimentation.

In another preferred embodiment, there is detachably mountable to the base support structure of the turntable device, a stationary perforated stirring element. The stirring element has a mounting arm rigidly mountably attachable onto the mounting base, as with other components of the combination, devoid of any metallic fastening structure.

With regard to the several illustrated wedge-fitting elements illustrated as at least one embodiment thereof, it should be understood that there could readily be many variations in the structure and mechanism of attaching elements devoid of screws and bolt of metal. Accordingly, while the illustrated structures and mechanisms of attachment are believed to be of a preferred and highly functional and inexpensive nature from the standpoint of both manufacture and assemblage thereof, the invention is not limited to merely elements and embodiments illustrated, but includes variations and equivalents within the scope of the larger generic concepts of the invention.

With regard to the above-noted perforated stirring element, the major concern with regard to the functional structural portion, i.e. the part that stirs as the food is revolved, the perforated portion may be of any of a variety of shapes and structures, may include strands, and/or may be sturdy ribs or the like, of parallel strips and/or checker-board fashion—as the illustrated embodiment. It is, however, preferable that the plastic material and structure be such, considered together, that there is some flexibility such that the stirer will flex or yield slightly whenever lumps or heavy objects are encountered within the vessel being stirred.

While not illustrated, it is also within the scope of the invention to have the turntable of such shape and/or with appropriate anchoring elements as to prevent the vessel or container from slipping-off of the turntable during rotation, particularly when the stirrer is being employed in the mounted state.

THE FIGURES

Figure 1:
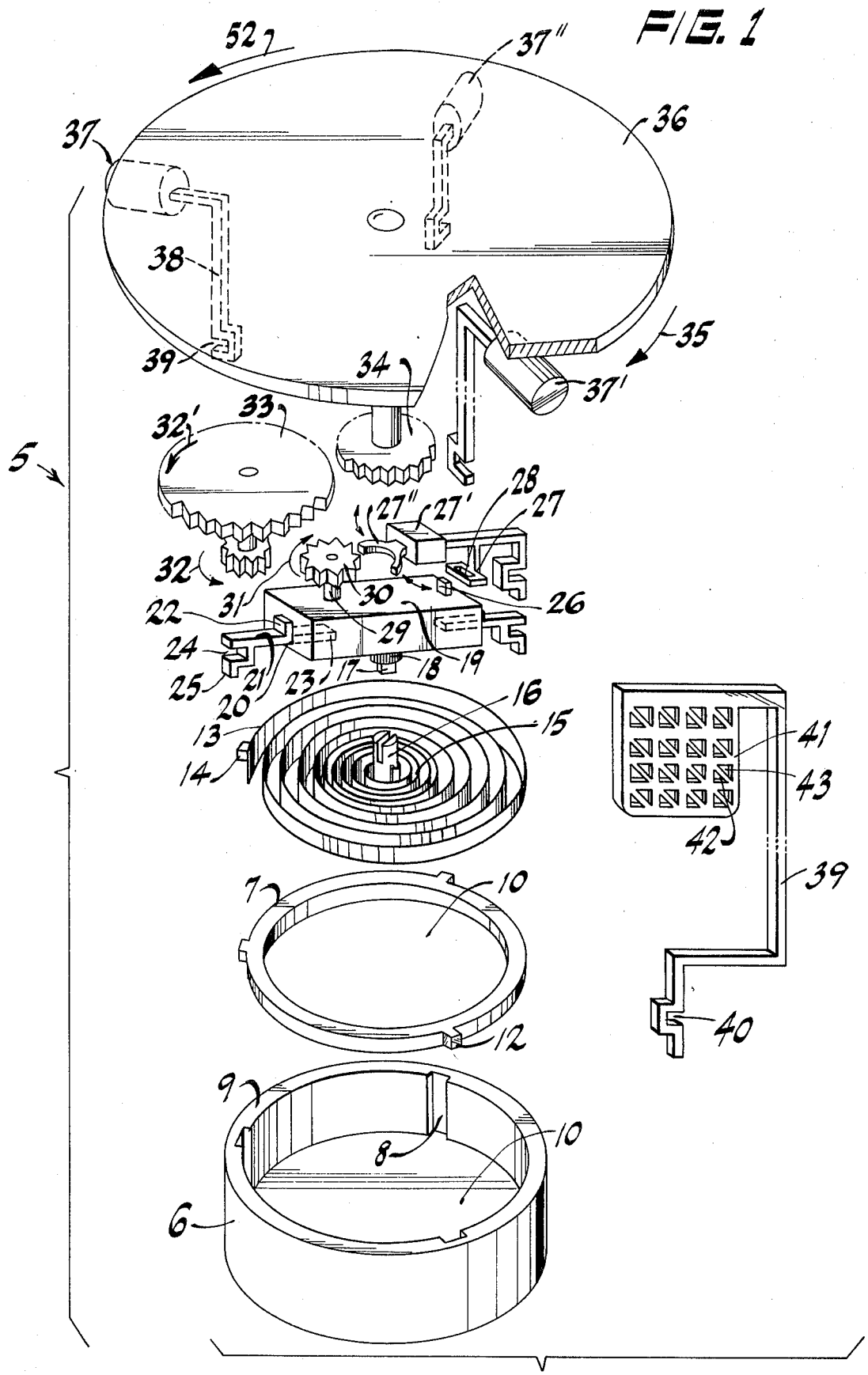
FIG. 1 illustrates a perspective exploded view of a preferred embodiment of the invention, symbollically illustrating the conventional components such as gearing (gear box) and escapement unit (box), turntable-support rollers, and the like, together with the detachable stirer.

As noted-above, of plastic spring material utilizable within the scope of the present invention, while it is within the scope of the invention to utilize any of several possible plastics as the material of the spring(s) of the present invention, for example polypropylene—which is durable and flexible at a wide range of temperatures, there is a readily available plastic spring made of E. I. DuPont, known as Delrin springs, which are preferred for the present invention, but the invention clearly is not limited to the use solely of such springs of Dupont.

In like manner, gear mechanism and escapement mechanisms are well known and do not constitute the invention, the same being merely manufactured out of plastic on order from manufacturer(s) of such devices, both being typified by a conventional clock works.

The unit of the present invention, when a food-laden vessel is supported on the turntable, will revolve within a range of from twenty to forty minutes, based on the present operational model thereof; however, the period of revolving may be varied considerably by varying the spring structure and size and dimensions thereof, and other preferred features noted-above, as well as by adjusting the rate of escapement release of spring energy to thereby vary the revolutions per minute of the turntable.

While no controls are illustrated for the escapement mechanism, and while preferably such is fixed devoid of adjustment mechanism which normally would be expected to complicate the manufacture as well as the operation for the typical housewife, it is within the scope of the invention to include such variable adjustment levers, or the like. Such would however disadvantageously increase cost, and decrease durability most probably.

Optimally, and in an operative embodiment built by the inventor, the escapement is adjusted such that the turntable revolves at substantially two rpm.

In optimum and preferred operation of the preferred embodiment, after placing the vessel on the turntable—or alternately just before, the operator (housewife/cook) manually merely winds the turntable in a counter-clockwise direction (typically) thereby winding and tightening the spring until the number of revolutions of wind is slightly more than twice the period of time, in minutes, desired for the cooking; i.e. if twenty minutes of cooking is desired, wind-up to between twenty-five and thirty revolution times two, i.e. a total of fifty to sixty winding revolutions of winding, after which the turntable is released with the vessel resting thereon, for revolving at 2 rpm for the twenty minute period.

Food and container-vessel total weight contemplated for a typical embodiment of the present invention may range up to about fifteen pounds or more typically, without any problems, this being sufficient for most any food that would be prepared within a microwave home oven. The dimensions of the elements of the turntable device of the invention may naturally be increase in size and dimensions in order to provide a commercial model as might be desired for restuarants or the like.

A turntable device of the present invention for home use typically has a unit size up to but normally not more than six inches in diameter and $1\frac{1}{2}$ inches in total height. Accordingly, it must be recognized that the illustrations of the Figures are purely diagrammatic and for the purpose of illustrating in large views and dimensions, the spirit of the invention, rather than actual size and dimensions.

In addition to escapement mechanism, it is apparent to an ordinary artisan that conventional gearing serves to predetermine the rate of revolutions obtained from the spring. In the absence of a typical escapement mechanism, there may within ordinary skill be substituted an equivalent braking mechanism which prevents a release above a predetermined desired rpm for the turntable.

With regard to the Figures, the FIG. 1 illustration is representative of a typical and preferred embodiment, as follows.

The portable microwave oven-turntable device 5 has a support base structure 6 having cylindrical sides 9 with slots 8 in the inside walls spaced equally around (preferably three, as shown), and having bottom 10. The annular ring 7 fits snugly and firmly (close-fit) within the walls 9, having the projections 12 fitted retainingly within the slots 8, and having annulus space 11 centrally thereof. All other elements are mounted within the grooves (slots) 8 and/or onto the annular ring 7. The key 14 of the coilspring 13, becomes mounted in a slot 8 as an anchoring mechanism for the outer end thereof. At the inner spring end 15, the attachment female key 16 receives the male key 17 of shaft 18. Shaft 18 extends from the gear-box graphically & diagrammatically shown as gear-box 19. The gear-box 19 has typically female anchor holes 20 receiving male element 23 having abutment 22 which prevents the structure 21 from moving too far inwardly into the hole 20. The slot 24 receives the annular ring 7, while the extension 25 presses firmly against the inside surface of the wall 9. The projection 26 of cuboid shape extends upwardly for the mounting thereon of the female member 27 having squared hole 28, for the mounting of the escapement mechanism 27' of which the escapement teeth 27" move alternately to and fro in engagement with and release of gear 30 which is driven by shaft 29 which is the out-put shaft of the gear-box 19. The gear 30 engages and drives, and by predetermined relative diameters thereof, further determines rpm, the gear structure 33 and 34, serially arranges as merely diagrammatically typical, which gear 34 drives the turntable 36 which revolves on and is supported by rollers 37, 37' and 37"—preferably three in number as shown; the respective rollers are mounted on support structure 38 of which the slot 39 receives the mounting annular ring 7. To wind the turntable 36, it is manually turned in direction 52. During the unwinding, i.e. during turning during cooking, the turntable moves in direction 35.

The stationary stirrer has support structure 39 of which the slot 40 receives the annular ring 7, and the stirring portion 41 has through-spaces (channels) 43 formed by the cross-structures 42, these merely being typical of typical perforated structures.

Figure 2:
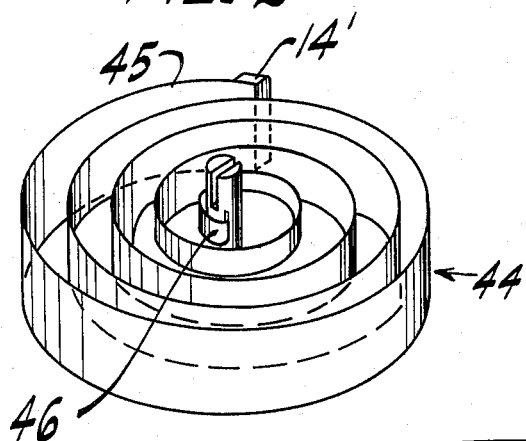
FIG. 2 illustrates a perspective side view of a preferred plastic coil spring having narrowing width.

FIG. 2 illustrates an entire alternate and preferred coilspring 44 having enlarged-width outer-end 45 with key 14' which engages slot 8, and narrow width inner-end 46.

Figure 3:
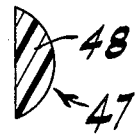
FIG. 3 illustrates a cross-sectional view of an alternate preferred embodiment of a plastic coil spring of the invention.

FIG. 3 illustrates a half-disk shaped preferred spring as shown in cross-section 48 for the spring structure 47.

Figure 4:
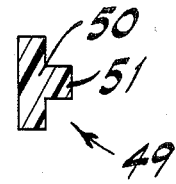
FIG. 4 illustrates a cross-sectional view of an alternate other preferred embodiment of a plastic coil spring of the invention.

FIG. 4 illustrates a ribbed preferred spring 50 having the rib 51 extending longitudinally along its length, as shown in cross-section structure, the rib being along the curved convex face of the spring in this embodiment (although not illustrated as such).

The success of cooking tasty food in a microwave oven is well known to depend upon careful timing and dutiful turning and—where applicable, diligent stirring. Many housewives have been very disappointed by their poor results in achieving the optimal results of tastily-cooked food here-to-fore. By the invention as described-above, it is now possible for any housewife having little or no significant mechanical ability, to prepare the best of meals by utilization of the present invention in combination with the conventional microwave oven which does not provide any mechanism for either turning, adjusting, nor stirring the food during the cooking, or at intermittent periods. By the present invention, any and all of these matters are cared for, and actual model experience has proven this matter.

Figure 5:
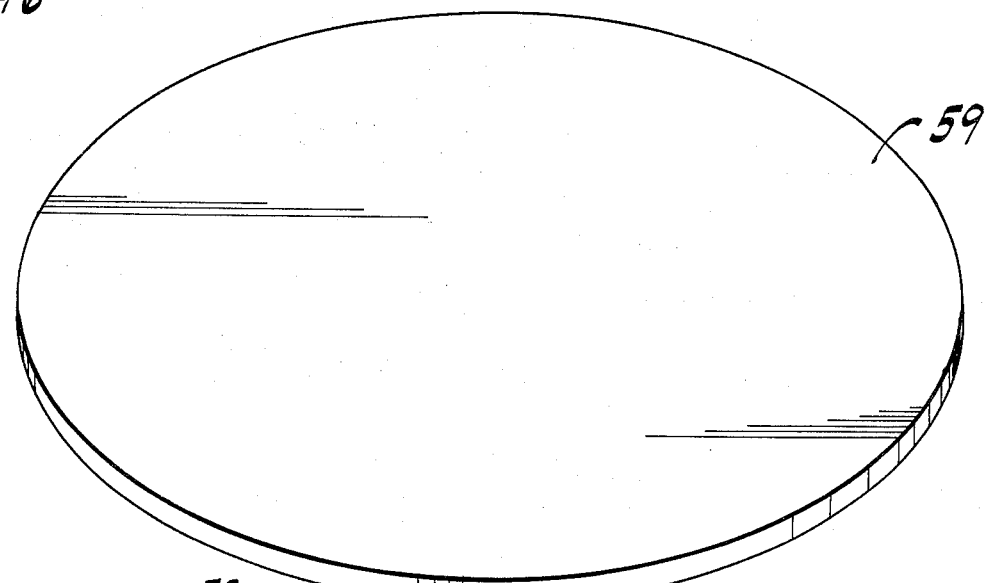
FIG. 5 is a perspective view of an alternate embodiment.

FIG. 5 represents a diagrammatic and symbolic view in perspective, side view, of a steam-driven turntable, whereby the steam-drive is substituted for a spring or other drive. A particular advantage of this embodiment of the invention is that its requires the simplest of mechanism, and water as the propellant becomes vaporized by the microwave energy of the microwave oven; in the microwave oven, already vented, there is no problem of potential excessive steam pressure. The steam pressure serves by escape valves directed against impellers, to rotate a turbine disc, which through appropriate gearing such as typically illustrated in FIG. 1, revolves the turntable thereof. Water is added through the water-input tube 53 into the steamer-vessel 54; steam from steam valve-outlets 55, impels against the impellers 56 to act through gearing 57 and escapement mechanism-unit 58 to thereby control the rate of rpm of the turntable 59; note that in this embodiment, the escapement 58 may be optional if the gearing is is such as to account for steam pressure and the calculated power of drive, and therefrom the speed that will result for the turntable 59.

It is within the scope of the invention to make variations and modifications and substitution of equivalents as would be apparent to a person of ordinary skill.

We claim:

1. A portable microwave oven-turntable device comprising a non-metallic drive means for imparting rotary motion to a turntable, and a non-metallic turntable connected to be driven by said non-metallic drive means the non-metallic drive means including a spring, and the non-metallic drive means being further adapted for controlled winding and controlled release of energy, and in which the non-metallic turntable includes turntable means for supporting and for revolving a supported cooking utensil in a substantially horizontal plane and at a predetermined rate of revolutions per minute sufficient to effect proper microwave cooking of a food carried by a supported cooking utensil, said turntable means being connected operatively to the non-metallic spring as to be driven by release of energy therefrom in a wound state, and portable support means for mounting each of said non-metallic drive means and said non-metallic turntable; and the portable support means and the non-metallic drive means and the non-metallic turntable as a unit being of a size and shape adapted for insertion into a microwave oven cooking space and for the support and revolving of food to be cooked in a microwave oven.

2. A portable microwave oven-turntable device of claim 1, in which said spring is a plastic spring.

3. A portable microwave oven-turntable device of claim 2, in which said plastic spring is a coil spring.

4. A portable microwave oven-turntable device of claim 3, in which said coil spring has a substantially half-disk cross-section.

5. A portable microwave oven-turntable device of claim 3, in which said coil spring has a back-rib running along a length of the plastic spring.

6. A portable microwave oven-turntable device of claim 1, including a stiring structure stationarily mountable detachably in association with the non-metallic drive means.

7. A portable microwave oven-turntable device of claim 1, including a stiring structure stationarily mountable detachably onto said portable support means.

8. A turntable device adapted for use in a microwave oven cavity for supporting and revolving food to be cooked therein comprising a non-metallic platform for supporting said food and a non-metallic drive means operatively coupled to said turntable for driving said platform at a controlled rate of speed to effect microwave cooking of food supported on said platform during a cooking cycle.

9. The turntable device in accordance with claim 8 further including a stirring element operatively mounted for automatically stirring said food during the cooking cycle.

10. A portable turntable device adapted to be removably inserted into a microwave oven cavity for selectively supporting and revolving food to be cooked therein comprising a non-metallic platform for supporting food to be cooked in said cavity and a non-metallic drive means operatively coupled to said platform for driving said platform at a controlled rate of speed to effect microwave cooking of foods supported on said platform during a cooking cycle.

11. The portable turntable device of claim 10 further including a stirring element operatively mounted to automatically stir the food during a cooking cycle.

12. A turntable device adapted for use in a microwave oven cavity for supporting and revolving food to be cooked therein comprising a non-metallic platform the supporting food to be cooked in said cavity, drive means operatively coupled to said turntable for driving said turntable at a controlled rate of speed to effect microwave cooking of foods supported on said turntable and stirring means operatively mounted to automatically stir the food during the cooking cycle.

13. The turntable device in accordance with claim 12 in which said stirring means includes an arm mounted with respect to said device for relative movement with respect to said food during the cooking cycle.

14. The turntable device in accordance with claim 13 in which the stirring means is perforated.

* * * * *